Fig. 1.
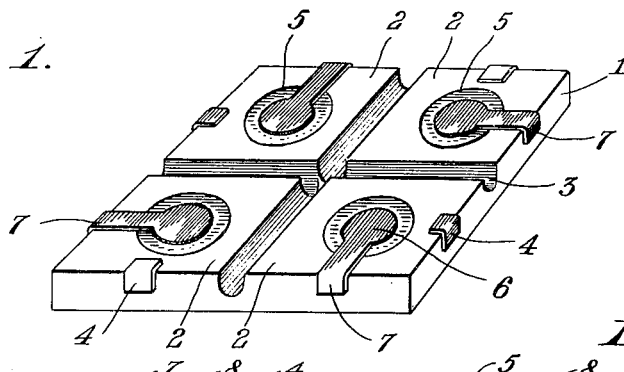
Fig. 2.
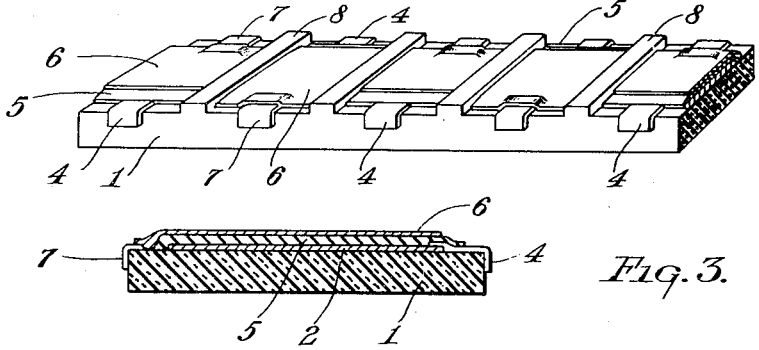
Fig. 3.
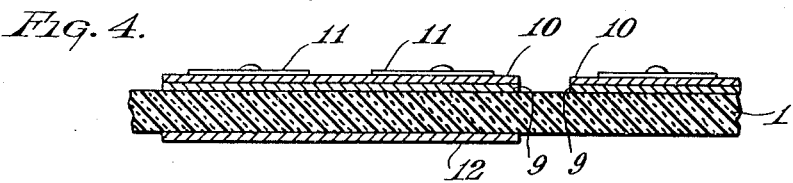
Fig. 4.
Fig. 5.
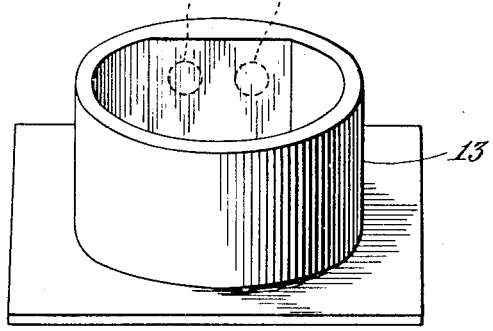
ROELOF DIRK BUGEL,
CORNELIS DE LANGE
INVENTORS.
BY
ATTORNEY.

Patented Oct. 25, 1949

2,486,110

UNITED STATES PATENT OFFICE 2,486,110

COMBINATION OF TWO OR MORE THAN TWO BLOCKING-LAYER CELLS

Roelof Dirk Bugel and Cornelis de Lange, Eindhoven, Netherlands, assignors to Hartford National Bank & Trust Co., Hartford, Conn., as trustee Application September 24, 1945, Serial No. 618,330
In the Netherlands November 16, 1943

Section 1, Public Law 690, August 8, 1946
Patent expires November 16, 1963

6 Claims. (Cl. 175—366)

The invention relates to a combination of two or more than two blocking-layer cells present on a common supporting plate. By blocking-layer cells are meant cells such as dry rectifiers and blocking-layer photocells, which consist of a conductive and a semi-conductive electrode which are separated by a blocking-layer.

When forming a combination of a plurality of blocking-layer cells, for example in order to obtain a full-wave rectifier or a series-connection of rectifiers for high voltages, it is frequently necessary to provide insulation between the various cells. The construction of the combination consisting of cells and insulation becomes comparatively complicated in this case whilst, in addition, the insulation takes up much space, especially in proportion to the dimensions of the cells if the latter are small.

It has previously been proposed to form a plurality of cells on one supporting plate (see, for example, Swiss Patent Specification No. 223,414 or British Patent Specification 309,919, Fig. 5). The supporting plate consists in these cases of metal so that those electrodes of the cells which are turned towards the supporting plate have the same potential. Here exists consequently only little liberty in connecting the cells.

The invention makes it possible to obtain any desired connection between the cells present on a common supporting plate.

According to the invention, the common supporting plate consists of insulating material.

The supporting plate is preferably provided with a plurality of conductive and mutually insulated layers on which the blocking-layer cells are formed. These layers constitute a current-supply member of low resistance for those electrodes of the cells which are turned towards the blocking-layer.

If the cells are of the cuprous oxide type, by which expression are meant cells wherein a semi-conductive electrode is intimately connected to a metal layer from which it is produced whilst between these layers the existence of a blocking-layer is assumed, these semi-conductive electrodes are preferably formed from the conductive layers provided on the insulating underlayer.

If a cell of the selenium type is concerned, i. e. a cell wherein the semi-conductor is provided on a conductive underlayer without a blocking-layer being formed whilst the blocking-layer is present between the semi-conductor and a conductive electrode provided afterwards and the semi-conductive electrode, which exists, for example, of selenium, is located on the side of the supporting plate, the conductive layer, so far as it adjoins the semi-conductor, is preferably formed from carbon. As is well-known, carbon possesses quite satisfactory properties for use as an underlayer for semi-conductive electrodes more particularly for electrodes consisting of selenium, on account of the satisfactory adherence and the low contact resistance.

The conductive layer, or at least part thereof, may consist of metal applied by fusion. By a layer of metal applied by fusion is meant a layer which has a high percentage of metal so that it acquires a satisfactory conductivity and which contains a binder or a flux, such as enamel, which favours the adherence to the underlayer.

The insulating supporting plate may consist of ceramic material. Such a ceramic supporting plate is satisfactorily resistant to the thermal treatments required, for example, for forming the semi-conductive electrode from the conductive one, for applying a layer of carbon by vaporisation or for applying a metal layer by fusion.

In order to obtain the desired connections between electrodes of different cells, that electrode of one cell which is remote from the supporting plate may be connected to an electrode of another cell which is turned towards the supporting plate, by means of a conductive intermediate layer, which may consist, for example, of conductive varnish.

If two similar electrodes have to be connected, they or, as the case may be, their conductive underlayers may be formed as a unit.

The invention is very suitable for obtaining a Graetz circuit-arrangement of four cells on one supporting plate or for obtaining a combination of a plurality of cells connected in series and provided on a strip-shaped supporting plate.

The supporting plate may form part of the casing of an electric apparatus, for example of a measuring instrument, in which event the combination takes up only very little space in this casing.

The blocking-layer cells need not be provided on one side of the supporting plate but they may, of course, also be provided on both sides of the plate.

Advantage is taken from the fact that the supporting plate consists of insulating material, if this plate is used so as to form the dielectric of a condenser. It is possible to provide on both sides of the plate separate coatings for such a condenser, but it is also possible to provide such a coating, which consists, for example, again of a metal layer applied by fusion, on that side of the supporting plate which is remote from a conductive underlayer of a blocking-layer cell.

The invention will be explained more fully with reference to the accompanying drawing, which represents, by way of example, a few embodiments thereof.

Fig. 1 shows in perspective a supporting plate provided with four cells whilst

Fig. 2 shows a strip-shaped supporting plate provided with a plurality of cells connected in series.

Fig. 3 represents a sectional view of a cell of the selenium type used in a combination according to Fig. 2.

Fig. 4 represents a sectional view of part of a combination according to the invention which comprises cells of the cuprous oxide type.

Fig. 5 represents a view in perspective of the casing of a measuring instrument, which casing constitutes at the same time the supporting plate in a combination according to the invention.

On the supporting plate 1 according to Fig. 1 are formed from carbon four conductive layers 2 by coating the whole of the said plate with carbon, for example by vaporisation and subsequently by dividing this layer by means of two slots 3. Each of the carbon layers is provided with a metal layer 4 applied by fusion, which layer serves for the supply of current. Subsequently, semi-conductive electrodes 5 consisting of selenium, are provided on the carbon layers. After these electrodes have been submitted in the usual manner to a thermal treatment for the conversion into the crystalline form and for the formation of a blocking-layer, conductive electrodes 6 consisting of an alloy melting at approximately 100° C., are squirted thereon. These electrodes 6 partly extend over the edge of the supporting plate so that connecting members 7 for these electrodes are formed. The various connecting members 4 and 7 may be interconnected, for example by means of conductive varnish, in such manner that a circuit-arrangement according to Graetz is obtained. At those places where the connections must be insulated from their underlayer there may be provided a layer of insulating varnish. It is also possible to give the conductive electrodes 6 such a shape that, where required, they are directly connected to a carbon layer 2.

The supporting plate 1 according to Figs. 2 and 3 has the shape of a strip on which a plurality of ridges 8 are provided. The upper surface of the strip is covered with a carbon layer 2, whereupon each of the parts of the carbon layer, which are located between two ridges, is provided with a connecting member 4 of metal applied by fusion. These connecting members are provided alternately on the one and on the other side of the strip. Subsequently, a layer 5 of selenium is provided on the carbon layer, whereupon the ridges 8 of the whole of the strip are slightly ground off so that the carbon and the selenium layers are separated by insulating strips into a plurality of separate parts. After the selenium layer has been submitted again to the usual treatments in order to obtain a satisfactory conductivity and to form a blocking-layer, the conductive electrodes 6 are provided, the edge of the selenium layer being left free by them on the side where the connecting members 4 are provided. On the other side, they extend as far as close to the edge of the strip and here they form connecting members 7. If desired, the latter may be stiffened by means of metal layers which beforehand have been applied by fusion to the insulating strip (see Fig. 3).

To the supporting plate according to Fig. 4 have been applied by vaporisation copper layers 9. Subsequently, these layers have been partly converted, by heating in a medium containing oxygen, into a layer 10 of cuprous oxide. It is assumed that between both layers a blocking-layer is formed. The layer 10 of cuprous oxide constitutes the semi-conductive electrode. It is provided with one or more conductive layers 11, which serve for the supply of current. On the supporting plate 1 are provided in this case two copper layers whilst on one of these copper layers are provided two blocking-layer cells.

On the underside of the supporting plate is provided a third conductive layer 12 which, jointly with one of the layers 9, forms a condenser. It is also possible, of course, to provide such a condenser on the supporting plate so as to be separated from the blocking-layer cells.

Fig. 5 shows the casing 13 of a measuring instrument for example a milliamperemeter, which casing constitutes at the same time the supporting plate of four cells 14 which may be provided thereon in any of the above-described ways. It is evident that in this construction the combination of these cells takes up only very little space.

What we claim is:

1. A blocking layer rectifier system comprising an electrically insulating supporting base, carbon layers positioned on said base in universal spaced relation and electrically insulated from each other, and a separate blocking layer cell in contacting relationship with each of said carbon layers.

2. A blocking layer rectifier system comprising a ceramic supporting base, layers of electrically conductive material positioned on said base in universal spaced relation and electrically insulated from each other, and a separate blocking layer cell in contacting relationship with each of said layers.

3. A blocking layer rectifier system comprising a ceramic supporting base, carbon layers positioned on said base in universal spaced relation and electrically insulated from each other, and a separate blocking layer cell in contacting relationship with each of said carbon layers.

4. A blocking layer rectifier system comprising a ceramic supporting base, fused metal layers positioned on said base in universal spaced relation and electrically insulated from each other, and a blocking layer cell in contacting relationship with each of said metal layers.

5. A blocking layer rectifier system comprising an electrically insulating supporting base, layers of electrically conductive material positioned on said base in universal spaced relation and electrically insulated from each other, a separate blocking layer cell in contacting relationship with each of said layers, said blocking layer cell comprising a semi-conductive electrode, a conductive electrode, and a blocking layer between said electrodes, and a layer of electrically conductive varnish interconnecting the electrode furthest removed from said base of one cell to the electrode nearest said base of one other cell.

6. A blocking layer rectifier system comprising an electrically insulating supporting base, said base defining directly opposed sets of surface portions, layers of electrically conductive material positioned on said surface portions in universal spaced relation and electrically insulated from each other, a separate blocking layer cell in contacting relationship with each of said layers, and capacitor elements comprising the conductive layers on the opposed surface portions and the electrically insulating base between said conductive layers.

ROELOF DIRK BUGEL.
CORNELIS DE LANGE.

REFERENCES CITED

The following references are of record in the file of this patent:

UNITED STATES PATENTS

| Number | Name | Date |
|---|---|---|
| 1,745,175 | Lilienfield | Jan. 28, 1930 |
| 2,215,667 | Sherman | Sept. 24, 1940 |
| 2,221,616 | Smith | Nov. 12, 1940 |
| 2,327,511 | De Lange et al. | Aug. 23, 1943 |
| 2,365,698 | Haigh | Dec. 26, 1944 |
| 2,369,185 | Skinker | Feb. 13, 1945 |
| 2,412,989 | Kotterman | Dec. 24, 1946 |
| 2,414,471 | Kotterman | Jan. 21, 1947 |

FOREIGN PATENTS

| Number | Country | Date |
|---|---|---|
| 584,115 | Germany | Sept. 15, 1933 |